(12) United States Patent
Kurokawa (10) Patent No.: US 9,422,986 B2
(45) Date of Patent: Aug. 23, 2016

(54) TELESCOPIC SHAFT

(71) Applicant: NSK LTD., Tokyo (JP)

(72) Inventor: Yoshifumi Kurokawa, Maebashi (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 14/239,627

(22) PCT Filed: Oct. 24, 2012

(86) PCT No.: PCT/JP2012/077506
§ 371 (c)(1),
(2) Date: Feb. 19, 2014

(87) PCT Pub. No.: WO2013/080714
PCT Pub. Date: Jun. 6, 2013

(65) Prior Publication Data
US 2014/0187339 A1    Jul. 3, 2014

(30) Foreign Application Priority Data

Dec. 1, 2011  (JP) .................................. 2011-263634

(51) Int. Cl.
*F16D 3/06* (2006.01)
*B62D 1/16* (2006.01)
(Continued)

(52) U.S. Cl.
CPC .. *F16D 3/06* (2013.01); *B62D 1/16* (2013.01); *B62D 1/20* (2013.01); *F16C 3/035* (2013.01); *F16D 2001/103* (2013.01)

(58) Field of Classification Search
CPC ....... F16C 3/03; F16D 3/06; F16D 2100/103; B62D 1/16; B62D 1/20

USPC ..................... 464/162; 403/359.6; 384/29, 42
See application file for complete search history.

(56) References Cited

U.S. PATENT DOCUMENTS 3,813,132 A * 5/1974 Sahm .............................. 384/42
4,944,606 A * 7/1990 Lindsey et al. ................. 384/42
(Continued)

FOREIGN PATENT DOCUMENTS

| EP | 1873038 A2 | 1/2008 |
| JP | 1-124427 U | 8/1989 |

(Continued)

OTHER PUBLICATIONS

International Search Report (PCT/ISA/210), dated Jan. 22, 2013, issued by the International Searching Authority in counterpart International Patent Application No. PCT/JP2012/077506.
(Continued)

*Primary Examiner* — Gregory Binda
(74) *Attorney, Agent, or Firm* — Sughrue Mion, PLLC (57) ABSTRACT

A telescopic shaft includes a male shaft having an outer circumference on which a plurality of protruding teeth are formed, and a female shaft having an inner circumference on which a plurality of tooth grooves are formed. The tooth grooves of the female shaft are fitted onto the protruding teeth of the male shaft such that the male shaft and the female shaft are relatively slidable in an axial direction and such that a rotational torque is transmittable between the male shaft and the female shaft. One of a curvature radius of a tooth surface of the protruding teeth and a curvature radius of a tooth surface of the tooth grooves is smaller than the other of the curvature radius of the tooth surface of the protruding teeth and the curvature radius of the tooth surface of the tooth grooves.

4 Claims, 7 Drawing Sheets

(51) Int. Cl.
  *B62D 1/20* (2006.01)
  *F16C 3/035* (2006.01)
  *F16D 1/10* (2006.01)

(56) References Cited

U.S. PATENT DOCUMENTS

2009/0270185 A1* 10/2009 Miyawaki
2014/0200086 A1* 7/2014 Kurokawa .................... 464/162

FOREIGN PATENT DOCUMENTS

| JP | 3-69715 A | 3/1991 |
| JP | H3-69715 U | 7/1991 |
| JP | 4-502503 A | 5/1992 |
| JP | 6-101718 A | 4/1994 |
| JP | H11-117931 A | 4/1999 |
| JP | 2008222016 A | 9/2008 |
| JP | 2009-168194 A | 7/2009 |
| JP | 2010-276177 A | 12/2010 |
| JP | 2012-122610 A | 6/2012 |
| WO | 9006450 A1 | 6/1990 |

OTHER PUBLICATIONS

Search Report dated Jul. 22, 2015, issued by the European Patent Office in counterpart European Application No. 12853047.4.
Written Opinion of the International Searching Authority issued Jan. 22, 2013 in International Application No. PCT/JP2012/077506.

* cited by examiner

TELESCOPIC SHAFT

TECHNICAL FIELD

The present invention relates to a telescopic shaft, and particularly, to a telescopic shaft including a male shaft and a female shaft which can transmit rotational torque and are relatively slidable with respect to an axial direction.

BACKGROUND ART

A steering apparatus includes telescopic shafts such as an intermediate shaft and a steering shaft, each having a male shaft and a female shaft capable of transmitting rotational torque and connected to be relatively slidable in an axial direction. The intermediate shaft is required to have a telescopic function when joining a universal joint to a pinion shaft to be engaged with a rack shaft of a steering gear so that the intermediate shaft is temporarily compressed before being engaged and joined to the pinion shaft, and also to absorb relative displacement with respect to a vehicle body frame.

The steering shaft transmits a steering force of the steering wheel to vehicle wheels, and is required to have a telescopic function to adjust a position of the steering wheel in an axial direction in accordance with a physical size and a driving posture of a driver.

In recent years, due to improvements in rigidity of the entire vehicle body and driving stability, it became easier for drivers to feel backlash of a telescopic shaft in rotation direction when operating a steering wheel. Therefore, a telescopic shaft with less backlash in the rotation direction, low sliding resistance, and superior lubricity and durability is being desired.

For that reason, there is a telescopic shaft in which an outer circumference of a tooth surface of a male shaft is covered with a resin or the like having low sliding resistance, and after applying a lubricant, it is fitted into a female shaft. In such a telescopic shaft, in order to smoothly supply lubricating grease to the tooth surfaces, it is desired to form grease reservoirs in a direction perpendicular to the axial direction. However, in a case of a telescopic shaft to be spline-joined, it is difficult to form grease reservoirs in the direction perpendicular to the axial direction, so it is an object to smoothly supply grease to the tooth surfaces. Also, according to a conventional method in which the tooth surfaces of a male shaft and a female shaft are formed to have a same profile, if an error occurs in the pressure angles of the tooth surfaces of the male shaft and the female shaft due to a manufacturing error of the tooth surfaces, the tooth surfaces of the male shaft and the female shaft locally hit each other, whereby wearing or deformation of the tooth surfaces increases, and the durability of a telescopic shaft is reduced.

In a telescopic shaft of Patent Document 1, the pressure angle of a male spline is made smaller than the pressure angle of a female spline, whereby a press fitting area is reduced and a balance is achieved between stable spline joining and ensuring the tooth thicknesses of tooth tops. However, in the telescopic shaft of Patent Document 1, since the tooth tops locally hit each other, wearing or deformation of the tooth tops increases. Also, if there is a manufacturing error in the pressure angle of the male spline and the pressure angle of the female spline, a change of a contact length in a tooth depth direction is large, and thus a variation of coupling rigidity increases.

In a telescopic shaft of Patent Document 2, a male shaft and a female shaft are engaged at an upper portion where a gap between the male shaft and the female shaft is narrow, whereby the contact point between the male shaft and the female shaft is set away from the center. Therefore, a rotational torque transmitting moment increases. However, in the telescopic shaft of Patent Document 2, a high surface pressure is locally created, and thus there is a problem in durability.

PRIOR ART DOCUMENTS

Patent Documents

Patent Document 1: JP 3-69715 U
Patent Document 2: JP 11-117931 A

DISCLOSURE OF INVENTION

Problem to be Solved by Invention

It is an object of the present invention to provide a telescopic shaft with improved durability.

Means for Solving the Problem

According to an aspect of the present invention, a telescopic shaft includes a male shaft having an outer circumference on which a plurality of protruding teeth are formed, and a female shaft having an inner circumference on which a plurality of tooth grooves are formed. The tooth grooves of the female shaft are fitted onto the protruding teeth of the male shaft such that the male shaft and the female shaft are relatively slidable in an axial direction and such that a rotational torque is transmittable between the male shaft and the female shaft. One of a curvature radius of a tooth surface of the protruding teeth and a curvature radius of a tooth surface of the tooth grooves is smaller than the other of the curvature radius of the tooth surface of the protruding teeth and the curvature radius of the tooth surface of the tooth grooves.

On both sides, in a tooth depth direction, of each engagement region where the tooth surface of the protruding teeth and the tooth surface of the tooth grooves engage with each other, wedge-shaped gaps may be formed to widen from a center part of the engagement region toward the both sides in the tooth depth direction.

A tooth top side of the tooth surface of the protruding teeth in the tooth depth direction may be formed with a round chamfered portion which is convex toward a outer side in a radial direction.

Both ends of the tooth surface of the protruding teeth in the tooth depth direction may be formed with round chamfered portions which are convex toward an outer side in a radial direction.

Tooth roots of the protruding teeth may be formed with clearance portions such that surfaces of the tooth grooves of the female shaft adjacent to tooth tops of the tooth grooves do not contact tooth roots of the protruding teeth.

On the tooth surface of the protruding teeth of the male shaft, a covering portion may be formed to reduce sliding resistance between the protruding teeth and the tooth grooves of the female shaft.

According to an aspect of the present invention, a telescopic shaft includes a male shaft having an outer circumference on which a plurality of protruding teeth are formed, and a female shaft having an inner circumference on which a plurality of tooth grooves are formed. The tooth grooves of the female shaft are fitted onto the protruding teeth of the male shaft such that the male shaft and the female shaft are relatively slidable in an axial direction and such that a rotational torque is transmittable between the male shaft and the female shaft. On at least one a tooth top side and a tooth root side, in a tooth depth direction, of each engagement region where a tooth surface of the protruding teeth and a tooth surface of the tooth grooves engage with each other, a wedge-shaped gap is formed to widen from a center part of the engagement region in the tooth depth direction toward the at least one of the tooth top side and the tooth root side.

On the tooth surface of the protruding teeth of the male shaft, a covering portion may be formed to reduce sliding resistance between the protruding teeth and the tooth grooves of the female shaft.

Advantage of Invention

According to an aspect of the present invention, one of the curvature radius of the tooth surface of the protruding teeth and the curvature radius of the tooth surface of the tooth grooves is smaller than the other of the curvature radius of the tooth surface of the protruding teeth and the curvature radius of the tooth surface of the tooth grooves. Therefore, the center part of the tooth surface of the protruding teeth in the tooth depth direction comes into contact with the center part of the tooth surface of the tooth grooves in the tooth depth direction, whereby rotational torque is transmitted. Therefore, even when there is a manufacturing error of the protruding teeth and the tooth grooves, the tooth surfaces come into contact at the center position in the tooth depth direction such that the contact area becomes large, and thus it is possible to reduce wearing or deformation of the tooth surfaces.

Also, on at least one of the tooth top side and the tooth root side, in the tooth depth direction, of each engagement region where the tooth surface of the protruding teeth and the tooth surface of the tooth grooves engage with each other, a wedge-shaped gap is formed to widen from the center part of the engagement region in the tooth depth direction toward the at least one of the tooth top side and the tooth root side. Therefore, when the rotational torque increases or decreases, grease is sucked from both sides of the engagement region in the tooth depth direction toward the center part. Therefore, grease lubrication is smoothly performed, and the durability of the telescopic shaft is improved.

EMBODIMENTS OF INVENTION

Hereinafter, embodiments of the present invention will be described in detail with reference to the drawings.

First Embodiment

Hereinafter, a first embodiment of the present invention will be described with reference to FIGS. 1 to 4.

Figure 1:
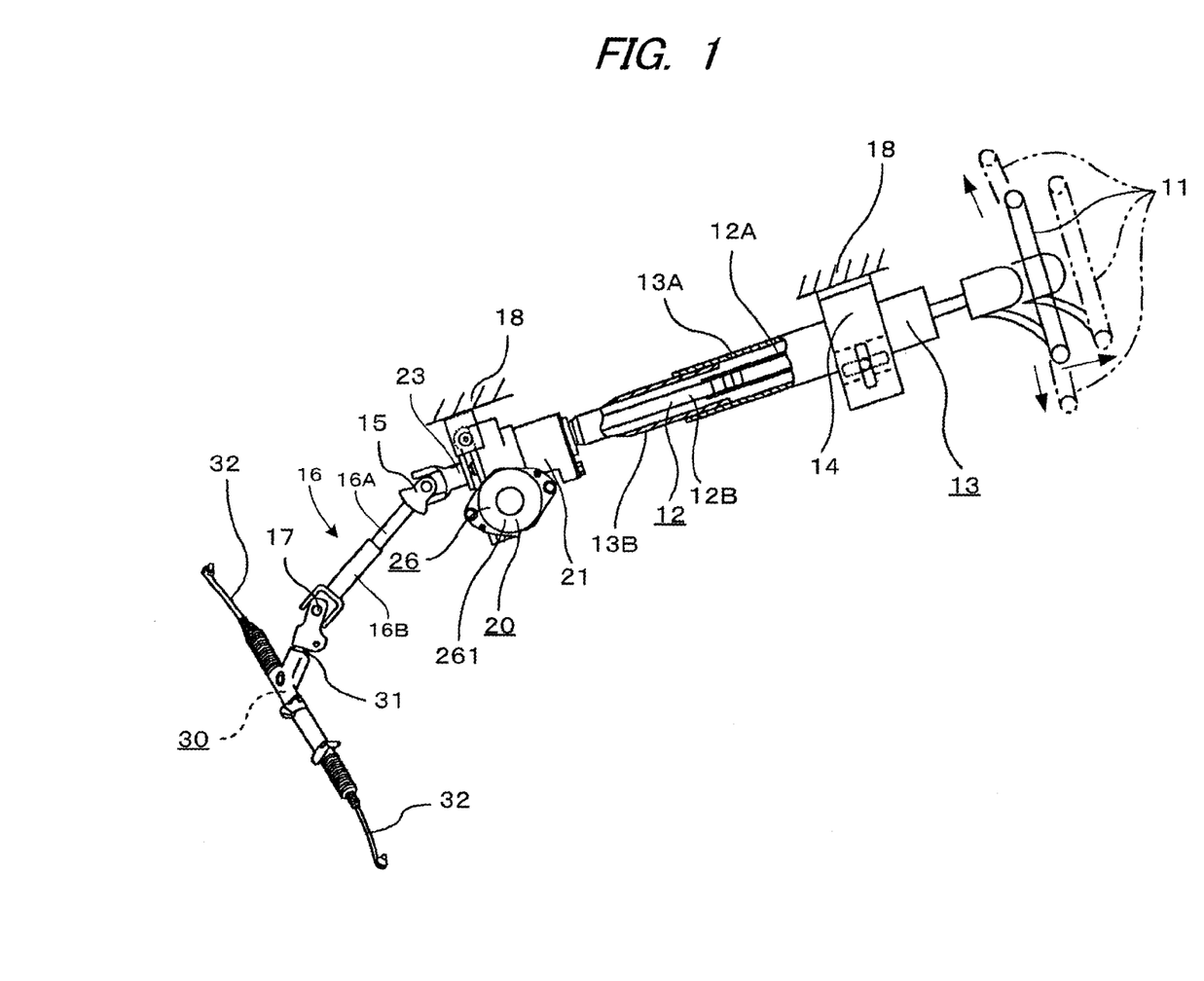
FIG. 1 is a side view of a steering apparatus according to a first embodiment of the present invention, with a portion of the steering apparatus cut out.

As shown in FIG. 1, a steering apparatus according to a first embodiment of the present invention includes a steering shaft 12 capable of mounting a steering wheel 11 on the rear side of a vehicle body (on the right side of FIG. 1), a steering column 13 having the steering shaft 12 inserted therein, an assistance device 20 (steering assistance device) for applying auxiliary rotational torque to the steering shaft 12, and a steering gear 30 connected to a portion of the steering shaft 12 on the front side of the vehicle body (on the left side of FIG. 1) through a rack-and-pinion mechanism (not shown).

The steering shaft 12 includes an outer shaft 12A and an inner shaft 12B. The outer shaft 12A and the inner shaft 12B are interlocked to be able to transmit rotational torque and be capable of relative displacement with respect to an axial direction. In other words, at the outer circumference of the inner shaft 12B on the rear side of the vehicle body, multiple male splines are formed. At the inner circumference of the outer shaft 12A on the front side of the vehicle body, multiple female splines are formed at the same phase positions as those of the male splines. The female splines of the outer shaft 12A are fitted onto the male splines of the inner shaft 12B with a predetermined gap, thereby being engaged with the male splines of the inner shaft 12B, such that the outer shaft and the inner shaft can transmit rotational torque and are capable of relative displacement with respect to the axial direction. Therefore, when the outer shaft 12A and the inner shaft 12B collide, the engagement regions of them relatively slide, thereby capable of reducing the entire length of the steering shaft 12.

The cylindrical steering column 13 having the steering shaft 12 inserted therein includes an outer column 13A and an inner column 13B. The outer column 13A and the inner column 13B are interlocked to be capable of telescopic movement, and form a collapsible structure such that in a case where an impact in the axial direction is applied during collision, the entire length of the steering column 13 is reduced while energy according to the impact is absorbed.

The front end portion of the inner column 13B is press-fitted into an end portion of a gear housing 21 on the rear side of the vehicle body, thereby being fixed thereto. The front end portion of the inner shaft 12B passes through the inside of the gear housing 21 and is joined with an input shaft of the assistance device 20.

The steering column 13 is supported on a portion of the vehicle body 18 such as the lower surface of a dashboard by a supporting bracket 14. Between the supporting bracket 14 and the vehicle body 18, a locking part is provided. In a case where an impact in a direction directed to the front side of the vehicle body is applied to the supporting bracket 14, the supporting bracket 14 slips from the locking part, and moves toward the front side of the vehicle body.

The upper end portion of the gear housing 21 is also supported on a portion of the vehicle body 18. The steering apparatus includes a tilting mechanism and a telescopic mechanism, which make it possible to adjust the position of the steering wheel 11 in the front/rear direction of the vehicle body and the vertical position of the steering wheel 11. These tilting mechanism and telescopic mechanism have been known, and thus will not be described in detail.

An output shaft 23 protruding from the front end surface of the gear housing 21 is connected to the rear end portion of a male intermediate shaft 16A (hereinafter, refereed to as a male shaft) of an intermediate shaft 16 through a universal joint 15. The front end portion of a female intermediate shaft 16B (hereinafter, referred to as a female shaft) of the intermediate shaft 16 is connected to the input shaft 31 of the steering gear 30 through another universal joint 17.

The male shaft 16A is connected to be relatively slidable in the axial direction and be able to transmit rotational torque with respect to the female shaft 16B. At the front end portion of the input shaft 31, a pinion is formed. A rack is engaged with the pinion, such that rotation of the steering wheel 11 moves a tie rod 32, thereby steering vehicle wheels.

To the gear housing 21 of the assistance device 20, a case 261 of an electric motor 26 is fixed. The direction and magnitude of rotational torque which is applied from the steering wheel 11 to the steering shaft 12 are detected by a rotational torque sensor. According to this detection signal, the electric motor 26 is driven to generate auxiliary rotational torque at the output shaft 23 through a decelerating mechanism.

Figure 2:
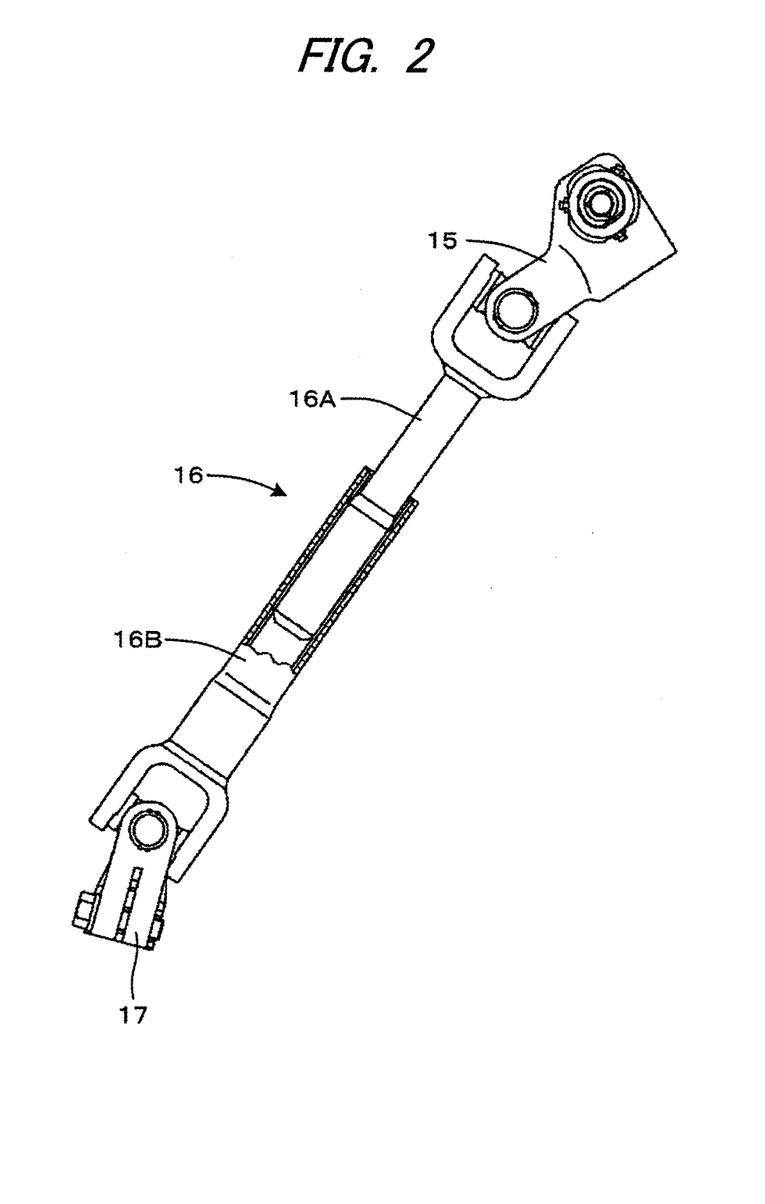
FIG. 2 is a side view of a telescopic shaft (intermediate shaft) of the steering apparatus of FIG. 1, with a portion of the telescopic shaft cut out.

FIG. 2 shows the intermediate shaft 16 including the male shaft 16A and the female shaft 16B, as a telescopic shaft according to the first embodiment of the present invention. The portion of the male shaft 16A on the front side of the vehicle body (a left end in FIG. 2) is fitted into a portion of the female shaft 16B on the rear side of the vehicle body (a right end in FIG. 2), thereby being connected thereto.

Figure 3A:
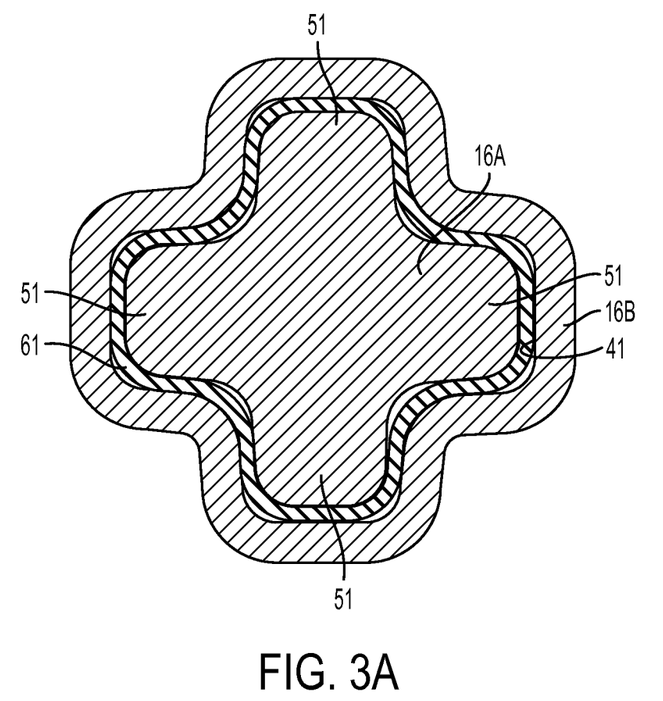
FIG. 3A is an enlarged sectional view of the telescopic shaft of FIG. 2, illustrating an example in which a male shaft of the telescopic shaft is covered with a sleeve.
Figure 3B:
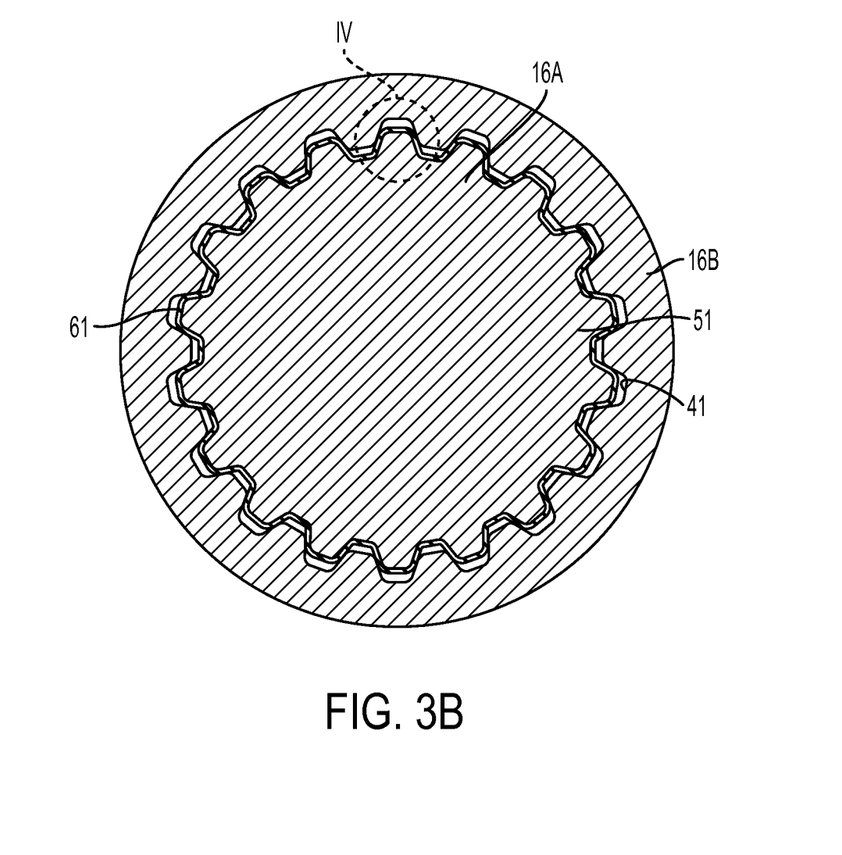
FIG. 3B is an enlarged sectional view of the telescopic shaft of FIG. 2, illustrating an example in which the male shaft of the telescopic shaft is coated with a covering portion.

As shown in FIGS. 2 to 3B, the female shaft 16B is formed in a hollow cylinder shape. At the inner circumference of the female shaft 16B, multiple axial tooth grooves 41 are formed radially from the shaft center of the female shaft 16B, at regular intervals, over the entire length of a telescopic range (telescopic stroke). The male shaft 16A and the female shaft 16B are formed, for example, with carbon steel or an aluminum alloy.

FIG. 3A shows an example in which protruding teeth 51 of the male shaft 16A are covered with a sleeve. The sleeve is an example of a covering portion 61 which reduces the sliding resistance between the protruding teeth 51 of the male shaft 16A (male spline shaft) and the tooth grooves 41 of the female shaft 16B (female spline cylinder).

The male shaft 16A has a non-circular outer circumference shape for transmitting rotational torque, and includes four protruding teeth 51 in the axial direction. The male shaft 16A is covered with the sleeve, over the entire length of the protruding teeth 51 in the axial direction.

An example of FIG. 3B shows an example in which the protruding teeth 51 of the male shaft 16A (the male spline shaft) are coated with the covering portion 61. The male shaft 16A has a non-circular outer circumference shape for transmitting rotational torque, and includes eighteen protruding teeth 51 in the axial direction. The male shaft 16A is coated with the covering portion 61, over the entire length of the protruding teeth 51 in the axial direction.

It is preferable to compose the covering portion 61 of rubber, for example, natural rubber, synthetic rubber, or a mixture of natural rubber and synthetic rubber. The present invention can be applied to a telescopic shaft including a male shaft and a female shaft which are relatively slidable, are able to transmit rotational torque, and have optional shapes. Also, the present invention can be applied to a telescopic shaft having protruding teeth 51 without a covering portion 61 formed.

Figure 4:
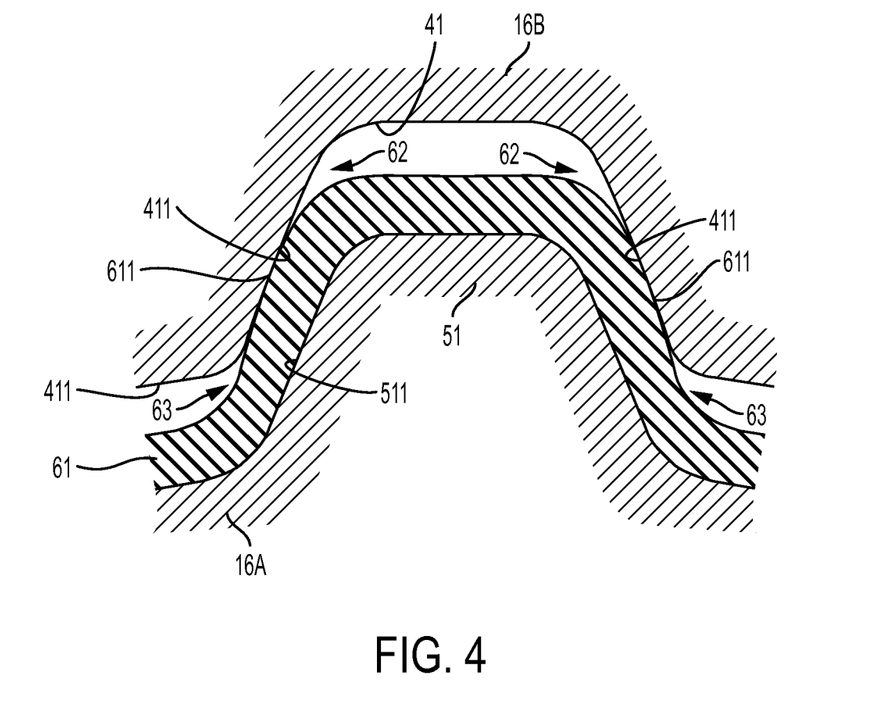
FIG. 4 is an enlarged view of a portion IV of the telescopic shaft according to the first embodiment of the present invention shown in FIG. 3B.
Figure 5:
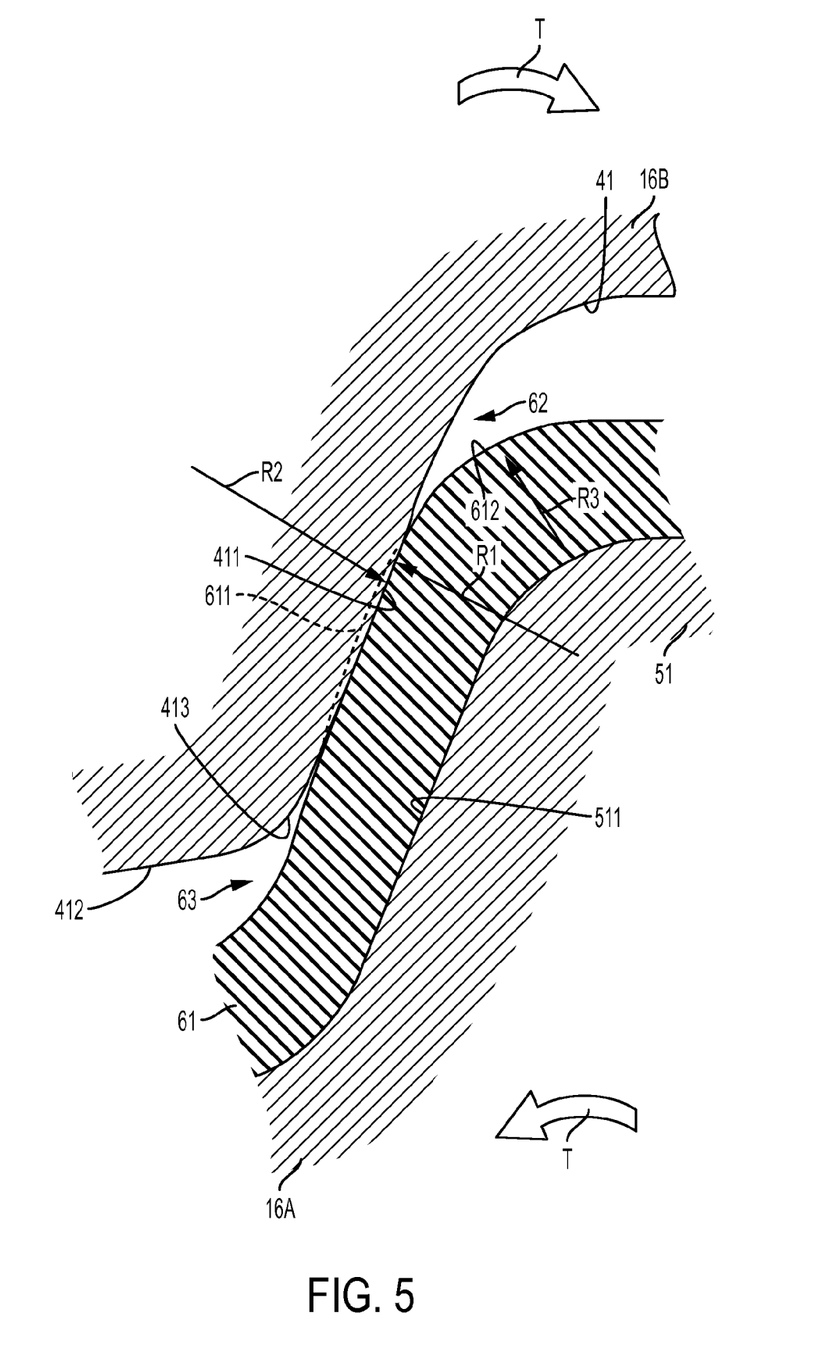
FIG. 5 is an enlarged view of an engagement region of FIG. 4.

FIG. 4 is an enlarged view of a portion 'IV' of FIG. 3B, and FIG. 5 is an enlarged view of an engagement region of FIG. 4. As shown in FIGS. 4 and 5, a tooth surface 511 of the protruding teeth 51 of the male shaft 16A is covered with the covering portion 61, such that the sliding resistance between the protruding teeth 51 and the tooth grooves 41 of the female shaft 16B is reduced. A tooth surface 611 of the covering portion 61 of the protruding teeth 51 is formed in an arc shape convex toward the outer side of the male shaft 16A in the radial direction. The curvature radius R1 of the tooth surface 611 is smaller than the curvature radius R2 of a tooth surface 411 of the tooth grooves 41 with which the tooth surface 611 comes into contact. On the tooth top side of the covering portion 61 of the protruding teeth 51 in the tooth depth direction, round chamfered portions 612 are formed to be convex toward the outer side of the male shaft 16A in the radial direction. The curvature radius R3 of each round chamfered portion 612 is smaller than the curvature radius R1 of the tooth surface 611.

When the female shaft 16B is fitted onto the male shaft 16A, the center part of the tooth surface 611 in the tooth depth direction is elastically deformed from a position shown by a broken line to a position shown by a solid line, such that the center part of the tooth surface 611 in the tooth depth direction comes into contact with the center part of the tooth surface 411 in the tooth depth direction, whereby the tooth surface 611 of the covering portion 61 of the protruding teeth 51 and the tooth surface 411 of the tooth grooves 41 transmit rotational torque. Therefore, even when there is a manufacturing error in the protruding teeth 51 and the tooth grooves 41, the tooth surface 611 and the tooth surface 411 can come into contact with each other at the center position in the tooth depth direction such that the contact area is wide, and thus it is possible to reduce wearing or deformation of the tooth surfaces. Also, on both sides, in the tooth depth direction, of each engagement region where the tooth surface 611 of the covering portion 61 of the protruding teeth 51 and the tooth surface 411 of the tooth grooves 41 engage with each other, wedge-shaped gaps 62, 63 are formed to widen from the center part of the engagement region toward the both sides in the tooth depth direction. A wedge-shaped gap may be formed on only one side of the tooth top side and tooth root side of each engagement region. Between the tooth grooves 41 of the female shaft 16B and the outer circumference of the covering portion 61, grease having predetermined hardness (consistency) is filled.

As shown in FIG. 5, when the rotational torque T is applied to the telescopic shaft, the covering portion 61 is compressed, whereby the wedge-shaped gaps 62, 63 are reduced. Also, when the rotational torque T decreases, the covering portion 61 expands, whereby the wedge-shaped gaps 62, 63 return to the original sizes. When the wedge-shaped gaps 62, 63 are large, the grease is sucked from both sides of each engagement region where the tooth surface 611 of the covering portion 61 of the protruding teeth 51 and the tooth surface 411 of the tooth grooves 41 engage with each other toward the center part in the tooth depth direction. Therefore, grease lubrication is smoothly performed, and the durability of the telescopic shaft is improved.

Also, since there are the wedge-shaped gaps 62, 63, the volume of a grease reservoir becomes large. On the basis of a change in the volumes of the wedge-shaped gaps 62, 63 according to an increase or decrease in the rotational torque T, the grease is efficiently sucked into the wedge-shaped gaps 62, 63. Also, on the tooth top side of the covering portion 61 of the protruding teeth 51, the round chamfered portions 612 are formed. Therefore, the tooth surface 611 and the round chamfered portions 612 are smoothly connected, and the grease is efficiently sucked into the wedge-shaped gaps 62.

Second Embodiment

Next, a second embodiment of the present invention will be described with reference to FIG. 6. Hereinafter, features different from those of the above-described first embodiment will be mainly described, and the same features as those of the first embodiment will not be described. The second embodiment is an example in which clearance portions are formed at the tooth roots of the covering portion 61 of the protruding teeth 51.

Figure 6:
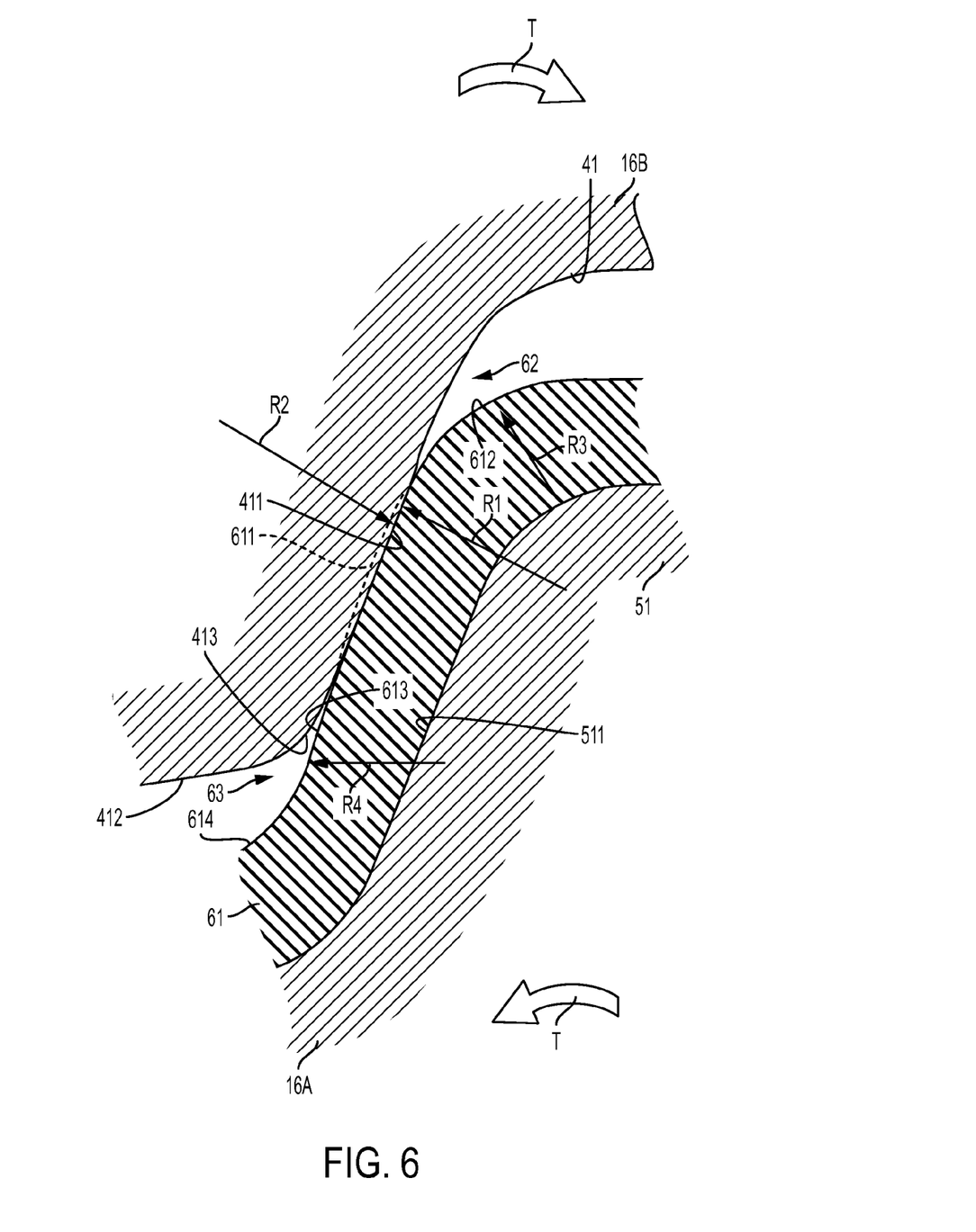
FIG. 6 is an enlarged sectional view of an engagement region of a telescopic shaft according to a second embodiment of the present invention.

As shown in FIG. 6, in a telescopic shaft of the second embodiment, similarly to the first embodiment, the tooth surface 511 of the protruding teeth 51 of the male shaft 16A is covered with the covering portion 61. The tooth surface 611 of the covering portion 61 of the protruding teeth 51 is formed in an arc shape convex toward the outer side of the male shaft 16A in the radial direction. The curvature radius R1 of the tooth surface 611 is smaller than the curvature radius R2 of the tooth surface 411 of the tooth grooves 41. Also, on the tooth top side and tooth root side of the covering portion 61 of the protruding teeth 51 in the tooth depth direction, round chamfered portions 612, 613 are formed to be convex toward the outer side of the male shaft 16A in the radial direction. The curvature radiuses R3 and R4 of the round chamfered portions 612, 613 are smaller than the curvature radius R1 of the tooth surface 611.

When the female shaft 16B is fitted onto the male shaft 16A, the center part of the tooth surface 611 in the tooth depth direction is elastically deformed from a position shown by a broken line to a position shown by a solid line, such that the center part of the tooth surface 611 in the tooth depth direction comes into contact with the center part of the tooth surface 411 in the tooth depth direction, whereby the tooth surface 611 of the covering portion 61 of the protruding teeth 51 and the tooth surface 411 of the tooth grooves 41 transmit rotational torque. Therefore, even when there is a manufacturing error in the protruding teeth 51 and the tooth grooves 41, the tooth surface 611 and the tooth surface 411 can come into contact with each other at the center position in the tooth depth direction such that the contact area is wide, and thus it is possible to reduce wearing or deformation of the tooth surfaces. Also, on both sides of each engagement region where the tooth surface 611 of the covering portion 61 of the protruding teeth 51 and the tooth surface 411 of the tooth grooves 41 engage with each other, the wedge-shaped gaps 62, 63 are formed to widen from the center part of the engagement region toward the both sides in the tooth depth direction.

In the second embodiment, unlike the first embodiment, at the tooth roots of the covering portion 61 of the protruding teeth 51, clearance portions 614 are formed such that surfaces 413 of the tooth grooves 41 of the female shaft 16B adjacent to tooth tops 412 of the tooth grooves 41 do not contact the tooth roots of the covering portion 61 of the protruding teeth 51. The clearance portions 614 are formed such that even after the male shaft 16A is slid back and forth with respect to the female shaft 16B such that the covering portion 61 is plastically deformed, a state in which the clearance portions 614 are slightly more concave than the tooth surface 611 is maintained. Between the tooth grooves 41 of the female shaft 16B and the outer circumference of the covering portion 61, grease having predetermined hardness (consistency) is filled.

As shown in FIG. 6, when the rotational torque T is applied to the telescopic shaft, the covering portion 61 is compressed, whereby the wedge-shaped gaps 62, 63 are reduced. Also, when the rotational torque T decreases, the covering portion 61 expands, whereby the wedge-shaped gaps 62, 63 return to the original sizes. When the wedge-shaped gaps 62, 63 are large, the grease is sucked from both sides of each engagement region where the tooth surface 611 of the covering portion 61 of the protruding teeth 51 and the tooth surface 411 of the tooth grooves 41 engage with each other toward the center part in the tooth depth direction. Therefore, grease lubrication is smoothly performed, and the durability of the telescopic shaft is improved.

Since the clearance portions 614 are formed at the tooth roots of the covering portion 61 of the protruding teeth 51, distances between the clearance portions 614 to be grease reservoirs and the wedge-shaped gaps 63 are short, and thus the grease is smoothly sucked into the wedge-shaped gaps 63. Also, since there are the wedge-shaped gaps 62, 63, the volumes of the grease reservoirs become large. Therefore, on the basis of a change in the volumes of the wedge-shaped gaps 62, 63 according to an increase or decrease in the rotational torque T, the grease is efficiently sucked into the wedge-shaped gaps 62, 63.

Also, on the tooth top side and tooth root side of the covering portion of the protruding teeth 51, the round chamfered portions 612, 613 are formed. Therefore, the tooth surface 611 and the round chamfered portions 612, 613 are smoothly connected, and the grease is efficiently sucked into the wedge-shaped gaps 62, 63.

In the above-described first and second embodiments, the tooth surface 611 of the covering portion 61 of the protruding teeth 51 may be formed to have an involute tooth profile, and the tooth surface 411 of the tooth grooves 41 may be formed in a straight tooth profile. Alternatively, the tooth surface 611 of the covering portion 61 of the protruding teeth 51 may be formed in a straight tooth profile, and the tooth surface 411 of the tooth grooves 41 may be formed to have an involute tooth profile. In other words, the curvature radius R2 of the tooth surface 411 of each tooth groove 41 may be smaller than the curvature radius R1 of the tooth surface 611. Alternatively, both of the tooth surface 611 of the covering portion 61 of the protruding teeth 51 and the tooth surface 411 of the tooth grooves 41 may be formed to have involute tooth profiles. In this case, an approximate curvature radius of one involute tooth profile may be smaller than an approximate curvature radius of the other involute tooth profile.

Although examples in which the present invention was applied to telescopic shafts having splines have been described in the above-described embodiments, the present invention may be applied to a telescopic shaft having serration. In the above-described embodiments, the covering portion 61 for reducing the sliding resistance is formed on the protruding teeth 51 of the male shaft 16A. However, a covering portion 61 may be formed on the tooth grooves 41 of the female shaft 16B. Also, on the protruding teeth 51 of the male shaft 16A and on the tooth grooves 41 of the female shaft 16B, covering portions 61 may be formed. Also, the entire male shaft 16A or female shaft 16B may be formed with the same material as that of the covering portion 61 for reducing the sliding resistance. Alternatively, on any of the protruding teeth 51 of the male shaft 16A and the tooth grooves 41 of the female shaft 16B, a covering portion 61 may not be formed.

Also, although the examples in which the present invention was applied to the intermediate shaft 16 have been described in the above-described embodiments, the present invention can be applied to other telescopic shafts of steering apparatuses, such as the steering shaft 12. Also, although the examples in which the present invention was applied to the steering apparatus having the assistance device 20 have been described in the above-described embodiments, the present invention can be applied to steering apparatuses with no assistance devices.

This application is based on Japanese Patent Application No. 2011-263634 filed on Dec. 1, 2011, the content of which is incorporated herein by reference.

INDUSTRIAL APPLICABILITY

The present invention is applicable to a telescopic shaft including a male shaft and a female shaft which are relatively slidable and can transmit rotational torque.

DESCRIPTION OF REFERENCE NUMERALS AND SIGNS

16A Male Intermediate Shaft (Male Shaft)
16B Female Intermediate Shaft (Female Shaft)
41 Tooth Groove
411 Tooth Surface
412 Tooth top
413 Surface Adjacent to Tooth top
51 Protruding Tooth
511 Tooth Surface
61 Covering Portion
611 Tooth Surface
612, 613 Round chamfered portion
614 Clearance Portion
62, 63 Wedge-Shaped Gap

The invention claimed is:

1. A telescopic shaft comprising:
a male shaft having an outer circumference on which a plurality of protruding teeth are formed; and
a female shaft having an inner circumference on which a plurality of tooth grooves are formed,
wherein the tooth grooves of the female shaft are fitted onto the protruding teeth of the male shaft such that the male shaft and the female shaft are relatively slidable in an axial direction and such that a rotational torque is transmittable between the male shaft and the female shaft,
wherein a covering portion, made of an elastic material, covers a tooth surface of the protruding teeth to reduce sliding resistance between the protruding teeth and the tooth grooves of the female shaft, and
wherein a tooth surface of a center part of the covering portion is formed in an arc shape convex toward an outer side of the male shaft in a radial direction, and a curvature radius corresponding to the tooth surface of the center part of the covering portion is smaller than a curvature radius corresponding to a tooth surface of a center part of the tooth grooves.

2. The telescopic shaft according to claim 1, wherein tooth roots of the protruding teeth are formed with clearance portions such that surfaces of the tooth grooves of the female shaft adjacent to tooth tops of the tooth grooves do not contact tooth roots of the protruding teeth.

3. The telescopic shaft according to claim 1, wherein both sides of an engagement region, where the tooth surface of the covering portion and the tooth surface of the tooth grooves engage with each other in a tooth depth direction, are formed with wedge-shaped gaps which widen from a center part of the engagement region toward the both sides in the tooth depth direction, and
wherein a round chamfered portion, being convex toward an outer side of the male shaft in a radial direction, is provided at a tooth top side of the tooth surface of the covering portion in the tooth depth direction, and a round chamfered portion, being convex toward the outer side of the male shaft in the radial direction, is provided at a tooth root side of the tooth surface of the covering portion in the tooth depth direction, and
wherein the tooth surface of the center part of the covering portion, the round chamfered portion of the tooth top side and the round chamfered portion of the tooth root side are convex toward a same direction.

4. The telescopic shaft according to claim 3, wherein tooth roots of the protruding teeth are formed with clearance portions such that surfaces of the tooth grooves of the female shaft adjacent to tooth tops of the tooth grooves do not contact tooth roots of the protruding teeth.

* * * * *